United States Patent
Nelson et al.

(10) Patent No.: US 10,389,508 B1
(45) Date of Patent: Aug. 20, 2019

(54) HIGH FREQUENCY FULL DUPLEX LINK MAINTENANCE

(71) Applicant: Rockwell Collins, Inc., Cedar Rapids, IA (US)

(72) Inventors: Randy W. Nelson, Anamosa, IA (US); Joseph A. Lahart, Cedar Rapids, IA (US); Robert G. McFarland, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/945,603

(22) Filed: Apr. 4, 2018

(51) Int. Cl.
*H04L 1/18* (2006.01)
*H04L 5/14* (2006.01)

(52) U.S. Cl.
CPC .................. *H04L 5/14* (2013.01); *H04L 1/18* (2013.01)

(58) Field of Classification Search
CPC .................. H04L 5/14; H04L 1/18
See application file for complete search history.

(56) References Cited

U.S. PATENT DOCUMENTS

| | | | | |
|---|---|---|---|---|
| 2003/0224801 | A1* | 12/2003 | Lovberg | H01Q 1/125 455/454 |
| 2014/0273856 | A1* | 9/2014 | Kyles | H04B 1/401 455/41.2 |
| 2016/0277212 | A1* | 9/2016 | Forbes | H04L 12/4633 |
| 2016/0278142 | A1* | 9/2016 | Babbage, II | H04W 76/12 |
| 2017/0034837 | A1* | 2/2017 | Lopez-Perez | H04W 72/1231 |
| 2017/0346616 | A1* | 11/2017 | Liu | H04W 72/04 |

* cited by examiner

*Primary Examiner* — Lakeram Jangbahadur
(74) *Attorney, Agent, or Firm* — Angel N. Gerdzhikov; Donna P. Suchy; Daniel M. Barbieri

(57) ABSTRACT

A system may include a first full duplex split site system and a second full duplex split site system. The first full duplex split site system may include a first transmitter and a first receiver. The second full duplex split site system may include a second transmitter and a second receiver. The first transmitter may be configured to transmit a data payload to the second receiver via a high frequency (HF) link on a first frequency. The first receiver may be configured to: instruct the first transmitter to send a command to the second receiver to instruct the second transmitter to establish a maintenance link with the first receiver on a frequency different from the first frequency; and command the first transmitter to begin transmitting the data payload to the second receiver.

14 Claims, 4 Drawing Sheets

US 10,389,508 B1

HIGH FREQUENCY FULL DUPLEX LINK MAINTENANCE

BACKGROUND

Long haul high frequency (HF) skywave communications refract radiofrequency (RF) signals from the ionosphere back to the earth's surface. Ionospheric scintillation results in channel fading with ranges up to 25 decibel (dB) within 60 to 90 seconds duration. In addition, an RF signal will often refract from multiple layers of the ionosphere resulting in multiple RF signal "echoes" referred to as multipath delay spread. Due the volatility of HF channel quality, successful HF data transport depends upon adapting to the volatility by adjusting waveform modulations and frequency selection.

SUMMARY

In one aspect, embodiments of the inventive concepts disclosed herein are directed to a system. The system may include a first full duplex split site system and a second full duplex split site system. The first full duplex split site system may include a first transmitter and a first receiver, the first transmitter and the first receiver communicatively coupled by a first data link. The second full duplex split site system may include a second transmitter and a second receiver, the second transmitter and the second receiver communicatively coupled by a second data link. The first transmitter may be configured to transmit a data payload to the second receiver via a high frequency (HF) link on a first frequency. The first receiver may be configured to: instruct the first transmitter to send a command to the second receiver to instruct the second transmitter to establish a maintenance link with the first receiver on a frequency different from the first frequency; and command the first transmitter to begin transmitting the data payload to the second receiver.

In a further aspect, embodiments of the inventive concepts disclosed herein are directed to a first full duplex split site system. The first full duplex split site system may be communicatively coupled to a second full duplex split site system. The first full duplex split site system may include a first transmitter and a first receiver, wherein the first transmitter and the first receiver may be communicatively coupled by a data link. The first transmitter may be configured to transmit a data payload to a second receiver of the second full duplex split site system via a high frequency (HF) link on a first frequency. The first receiver may be configured to: instruct the first transmitter to send a command to the second receiver to instruct a second transmitter of the second full duplex split site system to establish a maintenance link with the first receiver on a frequency different from the first frequency; and command the first transmitter to begin transmitting the data payload to the second receiver of the second full duplex split site system.

In a further aspect, embodiments of the inventive concepts disclosed herein are directed to a first full duplex split site system. The first full duplex split site system may be communicatively coupled to a second full duplex split site system. The first full duplex split site system may include a first transmitter and a first receiver, wherein the first transmitter and the first receiver may be communicatively coupled by a data link. The first receiver may be configured to: receive a data payload from a second transmitter of the second full duplex split site system via a high frequency (HF) link; collect and store metrics associated with the HF link; and perform operations to change at least one of a data rate, a bandwidth, an interleaver length, or a radiofrequency (RF) frequency for transmissions from the second transmitter to the first receiver based on the metrics.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
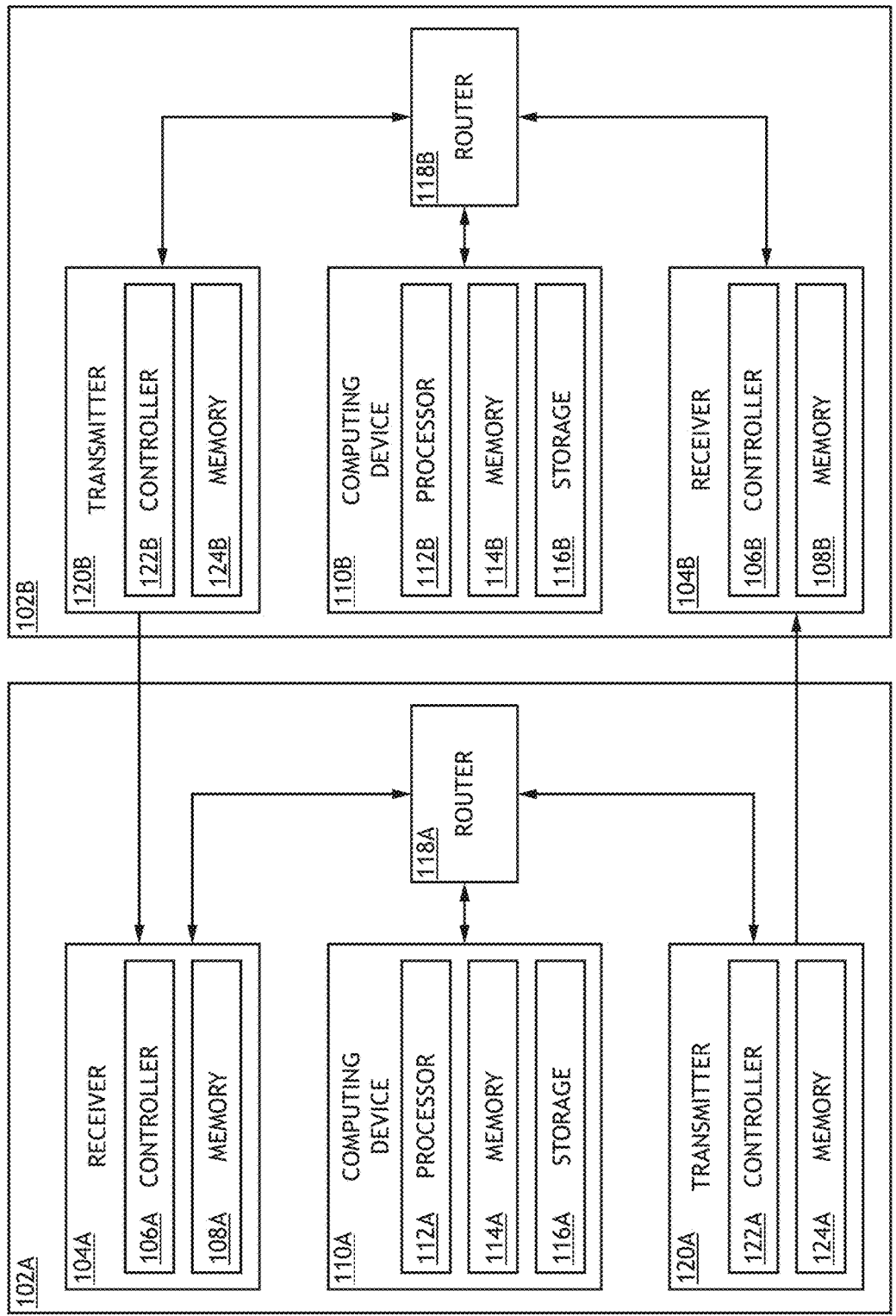
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1 a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method configured for near real-time adaptation to ionospheric scintillation challenges for HF systems supporting full duplex operation. Embodiments that employ a dynamic link maintenance protocol allows for quickly adapting to changing HF propagation environments so as to enable efficient and reliable data transport for full duplex split site systems.

Referring now to FIG. 1, an exemplary embodiment of a system according to the inventive concepts disclosed herein includes a split site system 102A and a split site system 102B, which may be communicatively coupled at any given time. The split site system 102A and the split site system 102B may each be configured to simultaneously send and receive HF communications (e.g., long haul HF skywave communications) and be configured for full duplex communications with each other. While FIG. 1 exemplarily shows two split site systems 102A, 102B, the system may include any number of split site systems.

Figure 2:
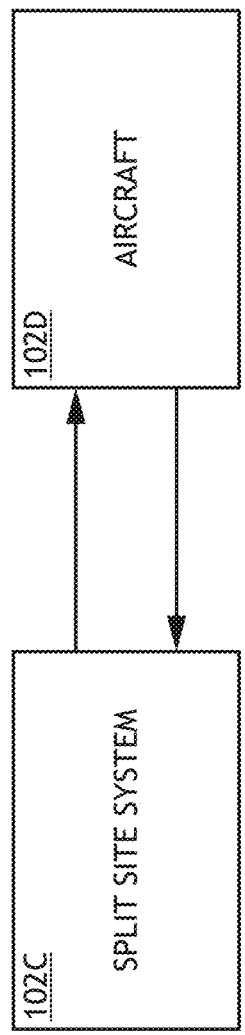
FIG. 2 is a view of an exemplary embodiment of a system according to the inventive concepts disclosed herein.

The split site system 102A may be implemented as a full duplex split site system configured to send and receive HF signals and/or communications (e.g., long haul HF skywave communications), which may be refracted from the ionosphere back to the earth's surface. In some embodiments, the split site system 102A may be implemented on the ground or on a vehicle (e.g., an aircraft (e.g., 102D, as shown in FIG. 2) or a watercraft (e.g., a maritime platform, such as a Navy ship (e.g., an aircraft carrier or a destroyer))). The split site system 102A may include at least one receiver 104A, at least one computing device 110A, at least one router 118A, and at least one transmitter 120A, some or all of which may be communicatively coupled at any given time.

The receiver 104A (e.g., an HF receiver) may be configured to receive HF signals and/or communications from a remote transmitter (e.g., transmitter 120B of the split site system 102B). In some embodiments, the receiver 104A may be implemented as a transceiver at least configured to receive HF signals or communications from a remote transmitter. The receiver 104A may include or may be communicatively coupled to at least one controller 106A and at least one memory 108A. The receiver 104A, via the controller 106A, may be configured to execute instructions of and perform a link maintenance protocol, as disclosed throughout. Additionally, the receiver 104A, via the controller 106A, may be configured to perform additional operations. The controller 106A may be configured to run or execute various software applications, computer code, and/or instructions stored (e.g., maintained) in at least one non-transitory computer-readable medium (e.g., at least one computer-readable medium implemented as hardware; e.g., at least one non-transitory processor-readable medium, at least one memory 108A (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof). Some or all of the at least one computer-readable medium may be communicatively coupled. In some embodiments, the controller 106A may be implemented as or include a processor. Additionally, for example, the controller 106A may be implemented as a special purpose controller configured (e.g., programmed) to execute instructions for performing any or all of the operations disclosed throughout.

The computing device 110A may include at least one processor 112A, memory 114A, and storage 116A, as well as other components, equipment, and/or devices commonly included in a computing device, all of which may be communicatively coupled to one another. The computing device 110A may be configured to control operation of the split site system 102A, send data for transmission by the transmitter 120A, and receive data received by the receiver 104A. Additionally, the computing device 110A may be configured to communicate with the receiver 104A and the transmitter 120A, such as via the router 118A. For example, the computing device 110A may be configured to route data for transmission by sending such data to the router 118A, which routes the data to the transmitter 120A. In some embodiments, such as where the split site system 102A is implemented on an aircraft, the computing device 112 may include or may be implemented as and/or be configured to perform the functionality of any suitable aircraft system, such as an engine indication and crew alerting system (EICAS) computing device, a flight management system (FMS) computing device, an integrated flight information system (IFIS) computing device, an information management system (IMS) computing device, an onboard maintenance system (OMS) computing device, a terrain awareness and warning system (TAWS) computing device, an automatic dependent surveillance (ADS) computing device, a traffic collision avoidance system (TCAS) computing device, and an aircraft communications addressing and reporting system (ACARS) computing device. The processor 112A may be configured to run various software applications or computer code stored (e.g., maintained) in a non-transitory computer-readable medium (e.g., memory 114A or storage 116A) and configured to execute various instructions or operations. Additionally, for example, the computing device 110A or the processor 112A may be implemented as a special purpose computer or special purpose processor configured (e.g., programmed) to execute instructions for performing any or all of the operations disclosed throughout. In some embodiments, the split site system 102A may include any suitable number of computing devices 110A.

The router 118A may be configured to route data among the computing device 110A, the receiver 104A, and the transmitter 120A.

The transmitter 120A (e.g., an HF transmitter) may be configured to transmit HF signals and/or communications to a remote receiver (e.g., receiver 104B of the split site system 102B). In some embodiments, the transmitter 120A may be implemented as a transceiver at least configured to transmit HF signals or communications to a remote receiver. The transmitter 120A may include or may be communicatively coupled to at least one controller 122A and at least one memory 124A. Additionally, the transmitter 120A, via the controller 122A, may be configured to perform additional operations. The controller 122A may be configured to run or execute various software applications, computer code, and/or instructions stored (e.g., maintained) in at least one non-transitory computer-readable medium (e.g., at least one memory 124A). Some or all of the at least one computer-readable medium may be communicatively coupled. In some embodiments, the controller 122A may be implemented as or include a processor. Additionally, for example, the controller 122A may be implemented as a special purpose controller configured (e.g., programmed) to execute instructions for performing any or all of the operations disclosed throughout.

In some embodiments, the split site system 102A may be implemented such that the receiver 104A and the transmitter 120A are connected together via at least one data link (e.g., internet, wires, cables, optical fiber, a carrier system (e.g., Transmission System 1 (T1) lines), and/or RF links (e.g., microwave links)) and/or the router 118A. The data link may be a local data and control link as opposed to an HF link (e.g., an HF ionospheric refraction link). In some embodiments, the paired receiver 104A and transmitter 120A may be implemented at least one mile apart to reduce (e.g., minimize) interference between multiple systems transmitting simultaneously.

The split site system 102A and the split site system 102B may be configured for full duplex communications such that the receiver 104A may receive HF communications from the transmitter 120B while the transmitter 120A transmits HF communications to the receiver 104B.

The split site system 102B may be implemented and function similarly to the split site system 102A. The split site system 102B may include at least one receiver 104B, at least one computing device 110B, at least one router 118B, and at least one transmitter 120B, some or all of which may be communicatively coupled at any given time. The receiver 104B, the computing device 110B, the router 118B, and the transmitter 120B may be may be implemented and function similarly to the receiver 104A, the computing device 110A, the router 118A, and the transmitter 120A, respectively.

The receiver 104B may include or may be communicatively coupled to at least one controller 106B and at least one memory 108B, which may be implemented and function similarly to the controller 106A and the memory 108A, respectively.

The computing device 110B may include may include at least one processor 112B, memory 114B, and storage 116B, which may be implemented and function similarly to the processor 112A, the memory 114A, and the storage 116A, respectively.

The transmitter 120A may include or may be communicatively coupled to at least one controller 122B and at least one memory 124B, which may be implemented and function similarly to the controller 122A and the memory 124A, respectively.

Still referring to FIG. 1, basic data and control flow for the full duplex system is shown. The split site system 102A and the split site system 102B are configured for full duplex link maintenance. The transmitter 120A of the split site system 102A is configured to transmit a data payload to the receiver 104B of the split site system 102B, and the transmitter 120B of the split site system 102B is configured to transmit a data payload to the receiver 104A of the split site system 102A.

Each receiver 104A, 104B of the respective split site system 102A, 102B may be configured as a master of the respective split site system 102A, 102B while each transmitter 120A, 120B may be configured as a slave. Each receiver 104A, 104B (e.g., via the controller 106A, 106B) may send a respective transmitter 120A, 120B commands and data to be transmitted by the respective transmitter 120A, 120B. Essentially, each transmitter 120A, 120B may be configured to acknowledge commands (e.g., via the controller 122A, 122B) received from the respective receiver 104A, 104B and to transmit data to the other split site system 102B, 102A in accordance with the commands received from the respective receiver 104A, 104B.

The full duplex system's link maintenance protocol (e.g., performed by the receiver 104A, 104B and/or the controller 106A, 106B thereof) may be designed to proactively identify degrading HF channel conditions as well as improve HF channel conditions. In addition, for example, when one or more of the receivers 104A, 104B are inactive (e.g., not receiving data payloads) the one or more receivers 104A, 104B may continuously scan predefined frequencies and adjacent spectrum to identify existing HF traffic. Performing the link maintenance protocol reduces wasted bandwidth and improves (e.g., optimizes) available data rate while maintaining suitable channel quality metrics.

For example, data to be transmitted by utilizing the full duplex link maintenance protocol may be a file, an image, HF broadcasts, or streaming video, which may be delivered by using Automatic Repeat reQuest (ARQ) protocol. ARQ file transfers retransmit errored packets while bit errors for broadcasts and streaming video are tolerant of a moderate number of bit errors that do not require bit retransmissions.

Embodiments may include setting up an automatic link establishment (ALE) link between the split site system 102A and the split site system 102B. Once the ALE link is setup, the full duplex link maintenance protocol may include multiple steps and may utilize an ARQ application.

For example, split site system 102A may receive a data payload (e.g., a file) from the computing device 110A for over-the-air transmission to split site system 102B.

The receiver 104A may instruct the transmitter 120A to send a command to the receiver 104B to instruct the transmitter 120B to establish a maintenance link with the receiver 104A by using a frequency different from (e.g., at least 10, 20, 30, 40, or 50 kilohertz (kHz) away from so as to minimize noise floor impacts which can degrade receiver quality) the transmitter 120A-receiver 104B link frequency. The maintenance link may use the ALE protocol to select a best available frequency. The maintenance link may be on a more robust (e.g., lower data rate) waveform than the HF link (e.g., between the transmitter 120A and the receiver 104B) to ensure that channel quality messaging from the split site system 102B to the split site system 102A has a high probability of success.

By using the data link between the receiver 104A and the transmitter 120A, the receiver 104A may command the transmitter 120A to begin transmitting the data payload to the receiver 104B.

The transmitter 120A may commence the transmission of the data payload to the receiver 104B. By utilizing the link maintenance protocol, the receiver 104B may collect, capture, and store in the memory 108B any or all of the following metrics: packet error data (e.g., packets with no errors and packets with errors that need to be retransmitted); signal-to-noise ratio (SNR) samples, which may be configurable for any suitable sampling interval; multipath delay spread samples, which may be configurable for any suitable sampling interval; Doppler spread samples, which may be configurable for any suitable sampling interval; impulse response samples, which may be configurable for any suitable sampling interval; RF signal strength, which may be configurable for any suitable sampling interval; and spectrum power data (e.g., used for identifying nearby interference from other HF transmissions), which may be configurable for any suitable sampling interval.

Additionally, the link maintenance protocol (e.g., performed or executed by the receiver 104A and/or 104B) may include performing at least one of dynamic data rate adaptation operations to change (e.g., repeatedly change; e.g., increase or decrease) the data rate, dynamic bandwidth adaptation operations to change a bandwidth, dynamic interleaver length adaptation operations to change an interleaver length, or dynamic RF frequency (e.g., RF dial frequency) adaptation operations to change an RF frequency (e.g., RF dial frequency) for transmissions between the split site system 102A and the split site system 102B based on channel quality metrics. That is, the link maintenance protocol (e.g., performed or executed by the receiver 104A and/or 104B) may include changing (e.g., repeatedly changing; e.g., increasing or decreasing) configurable parameters, such as at least one of a data rate, a bandwidth, an interleaver length (e.g., which can improve bit error performance at a cost of additional latency), or an RF frequency based on channel quality metrics.

For example, the link maintenance protocol may include increasing the data rate for transmissions between the split site system 102A and the split site system 102B. The controller 106B knows the HF link characteristics (e.g., bandwidth, waveform modulation, and interleaver length), which may be stored in the memory 108B, for the transmission based on the ALE link setup for the HF link. Based on the metrics stored in the memory 108B (e.g., packets with no errors and packets with errors; SNR samples; multipath delay spread samples; Doppler spread samples; impulse response samples; RF signal strength; and spectrum power data), the controller 106B may monitor the metrics, compare the metrics against predetermined metric thresholds associated with the HF link characteristics, and determine whether the metrics support an increased data rate for the HF link based on the comparison of the metrics against predetermined metric thresholds. For example, the controller 106B may access the metrics of the SNR samples and the multipath delay spread samples and compare the SNR samples and the multipath delay spread samples against a predetermined SNR threshold and a predetermined multipath delay spread threshold, respectively. If the controller 106B determines that the thresholds are less (e.g., significantly less, such as at least 10% less) than the compared real time metrics, the controller 106B may send a maintenance message to the transmitter 120B (e.g., via the data link (e.g., a fiber link) between the transmitter 120B and the receiver 104B). In response to receiving the maintenance message, the transmitter 120B may send a link maintenance command to the receiver 104A recommending or instructing to increase modulation for transmissions to a higher data rate. In response to receiving the link maintenance command, the receiver 104A (e.g., via the controller 106A) may command the transmitter 120A to stop transmitting. The receiver 104A (e.g., via the controller 106A) may then command the transmitter 120A to increase the data rate for the HF link and commence sending data packets, including any retransmissions of any errored packets, to the receiver 104B.

For example, the link maintenance protocol may include decreasing the data rate for transmissions between the split site system 102A and the split site system 102B. Based on the metrics stored in the memory 108B (e.g., packets with no errors and packets with errors; SNR samples; multipath delay spread samples; Doppler spread samples; impulse response samples; RF signal strength; and spectrum power data), the controller 106B may monitor the metrics, compare the metrics against predetermined metric thresholds associated with the HF link characteristics, and determine whether the data rate should be decreased for the HF link based on the comparison of the metrics against predetermined metric thresholds. The controller 106B may access the metrics and compare the metrics against predetermined thresholds. For example, the controller may determine whether SNR fading is below an incumbent modulation's minimum threshold (e.g., resulting in multiple errored packets), whether sampled multipath delay spread lengths are close to the incumbent modulation's threshold (e.g., risking synchronization loss), and whether there is erratic impulse response behavior (e.g., often resulting in synchronization loss). If the controller 106B determines that the thresholds are greater than the compared real time metrics, the controller 106B may send a maintenance message to the transmitter 120B (e.g., via the data link (e.g., a fiber link) between the transmitter 120B and the receiver 104B). In response to receiving the maintenance message, the transmitter 120B may send a link maintenance command to the receiver 104A recommending or instructing to decrease modulation for transmissions to a lower data rate for the HF link. In response to receiving the link maintenance command, the receiver 104A (e.g., via the controller 106A) may command the transmitter 120A to stop transmitting. The receiver 104A (e.g., via the controller 106A) may then command the transmitter 120A to decrease the data rate for the HF link and commence sending data packets, including any retransmissions of any errored packets, to the receiver 104B. Additionally, if the metrics are extremely poor (e.g., risking synchronization loss), the link maintenance protocol may include dropping the ALE link and initiating a new ALE link on a different frequency and/or bandwidth.

Furthermore, in the event of HF channel degradation or HF channel propagation suddenly deteriorating due to solar activities, normal ionospheric scintillation, or interference from other HF transmissions, the full duplex link maintenance protocol may break the ALE link. The ALE protocol may then identify a new frequency, a new ALE link is established, and the full duplex link maintenance protocol may be take control of the network for the new ALE link.

Some embodiments may include the use of dynamic data rate adaptation for link maintenance decisions. In some embodiments, HF data waveforms may feature several modulation options supporting successful data delivery during distressed ionospheric conditions, such as with SNRs as low as −10 dB (e.g., signal is below the HF noise floor). In addition, in some embodiments, the HF data waveforms can equalize channel multipath delay spreads of up to 10 milliseconds.

The receivers 104A, 104B may continuously sample signal quality metrics such as SNR, multipath delay spread, impulse response, and RF signal strength, as well as other channel quality characteristics. Each data rate modulation may be designed to perform within different channel quality environments. For example, if the SNR is 30 dB or higher and the multipath delay spread is small (e.g., less than 1.5 milliseconds), data rates as high as 240,000 bps (e.g., a a256-ary Quadrature Amplitude Modulation (256-QAM)) (using 48 kHz bandwidth) can be supported by the channel. Additionally, for example, if the SNR is −8 dB and the multipath delay spread is five milliseconds, the modulation selected (e.g., by the controller 106A, 106B) by performing the data rate selection algorithm may be 1,200 bps using a 48 kHz bandwidth. Determining (e.g., by the controller 106A, 106B) the best modulation for a given channel condition may be based upon a data structure (e.g., a database; e.g., stored in memory 108A, 108B) with the tolerance thresholds of all modulations. The modulation selection algorithm's database may contain each modulation's tolerance thresholds, and the controller 106A, 106B may select a modulation best matching the channel conditions.

Referring now to FIG. 2, an exemplary embodiment of a system according to the inventive concepts disclosed herein includes a split site system 102C and a split site system implemented on an aircraft 102D, which may be communicatively coupled at any given time. For example, the split site system implemented on the aircraft 102D may include multiple antennas, HF transceivers, and/or an HF transmitter and an HF receiver. The split site system 102C and the split site system implemented on an aircraft 102D may be implemented and function similarly to the split site systems 102A, 102B.

Figure 3:
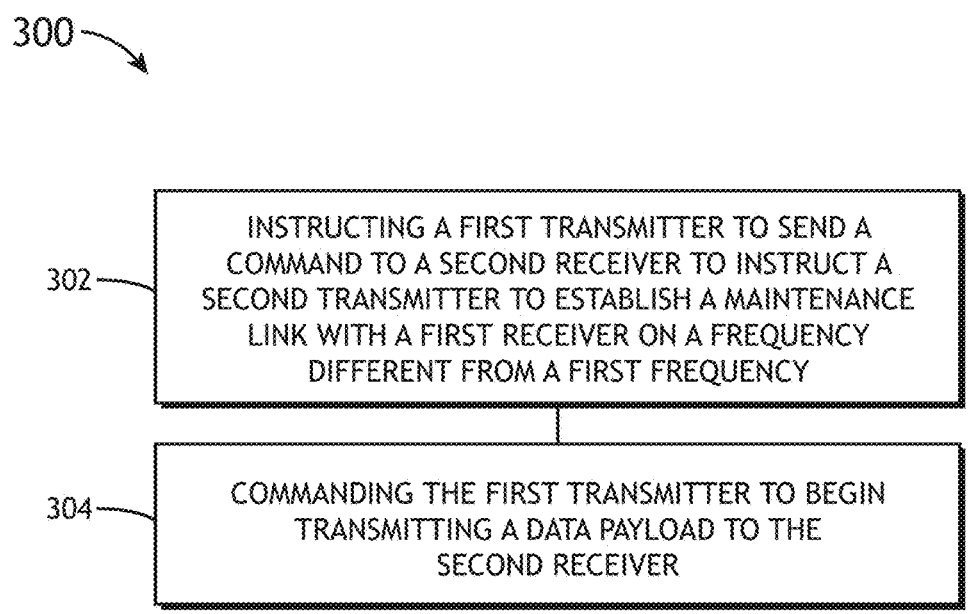
FIG. 3 is a diagram of an exemplary embodiment of a method according to the inventive concepts disclosed herein.

Referring now to FIG. 3, an exemplary embodiment of a method 300 according to the inventive concepts disclosed herein may include one or more of the following steps. Additionally, for example, some embodiments may include performing one more instances of the method 300 iteratively, concurrently, and/or sequentially. Additionally, for example, at least some of the steps of the method 300 may be performed in parallel and/or concurrently. Additionally, in some embodiments, at least some of the steps of the method 300 may be performed non-sequentially. The method 300 may be performed by a receiver 104A, 104B or a controller 106A, 106B thereof.

A step 302 may include instructing a first transmitter to send a command to a second receiver to instruct a second transmitter to establish a maintenance link with a first receiver on a frequency different from the first frequency.

A step 304 may include commanding the first transmitter to begin transmitting a data payload to the second receiver.

Further, the method 300 may include any of the operations disclosed throughout.

Figure 4:
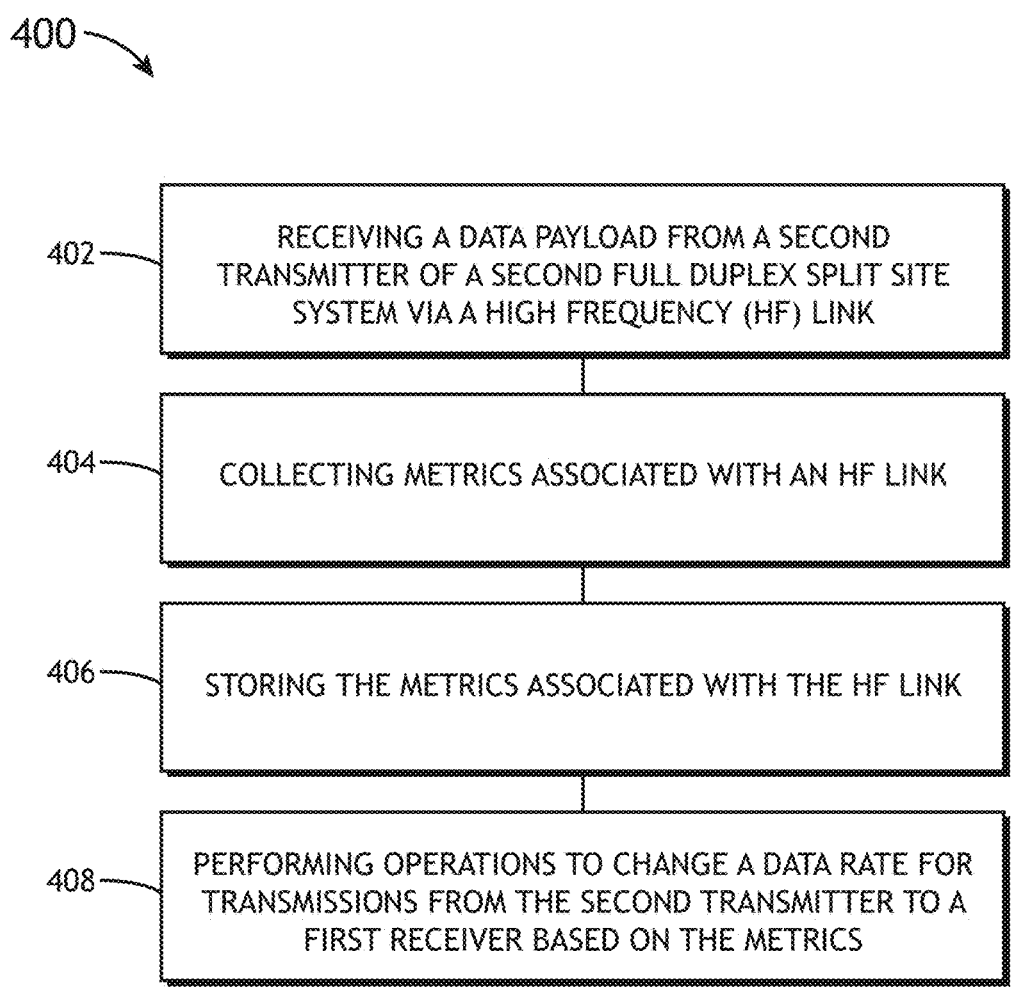
FIG. 4 is a diagram of an exemplary embodiment of a method according to the inventive concepts disclosed herein.

Referring now to FIG. 4, an exemplary embodiment of a method 400 according to the inventive concepts disclosed herein may include one or more of the following steps. Additionally, for example, some embodiments may include performing one more instances of the method 400 iteratively, concurrently, and/or sequentially. Additionally, for example, at least some of the steps of the method 400 may be performed in parallel and/or concurrently. Additionally, in some embodiments, at least some of the steps of the method 400 may be performed non-sequentially. The method 400 may be performed by a receiver 104A, 104B or a controller 106A, 106B thereof.

A step 402 may include receiving a data payload from a second transmitter of a second full duplex split site system via a high frequency (HF) link.

A step 404 may include collecting metrics associated with the HF link.

A step 406 may include storing the metrics associated with the HF link.

A step 408 may include performing operations to change a data rate, a bandwidth, or an interleaver length or to select a different frequency for transmissions from the second transmitter to a first receiver based on the metrics.

Further, the method 400 may include any of the operations disclosed throughout.

As will be appreciated from the above, embodiments of the inventive concepts disclosed herein may be directed to a method and a system configured for near real-time adaptation to ionospheric scintillation challenges for HF systems supporting full duplex operation.

As used throughout and as would be appreciated by those skilled in the art, "at least one non-transitory computer-readable medium" may refer to as at least one non-transitory computer-readable medium (e.g., memory 108A, memory 114A, memory 124A, memory 108B, memory 114B, memory 124B, storage 116A, storage 116B, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a first full duplex split site system comprising a first transmitter and a first receiver, the first transmitter and the first receiver communicatively coupled by a first data link; and
a second full duplex split site system comprising a second transmitter and a second receiver, the second transmitter and the second receiver communicatively coupled by a second data link;
wherein the first transmitter is configured to transmit a data payload to the second receiver via a high frequency (HF) link on a first frequency;
wherein the first receiver is configured to:
instruct the first transmitter to send a command to the second receiver to instruct the second transmitter to establish a maintenance link with the first receiver on a frequency different from the first frequency; and
command the first transmitter to begin transmitting the data payload to the second receiver;
wherein the second receiver is configured to:
collect and store metrics associated with the HF link;
perform operations to increase a data rate for transmissions from the first transmitter to the second receiver based on the metrics;
compare the metrics against predetermined metric thresholds;
determine whether the metrics support an increased data rate based on the comparison of the metrics against the predetermined metric thresholds; and
output a maintenance message over the second data link to the second transmitter, the maintenance message instructing the second transmitter to send a link maintenance command to the first receiver to increase a modulation for transmissions over the HF link to a higher data rate.

2. The system of claim 1, wherein the metrics include at least one of packet error data, signal-to-noise ratio (SNR) samples, multipath delay spread samples, impulse response samples, RF signal strength, or spectrum power data.

3. The system of claim 1, wherein the second receiver is configured to perform operations to change at least one of a data rate, a bandwidth, an interleaver length, or a radiofrequency (RF) frequency for transmissions from the first transmitter to the second receiver based on the metrics.

4. A system, comprising:
a first full duplex split site system comprising a first transmitter and a first receiver, the first transmitter and the first receiver communicatively coupled by a first data link; and
a second full duplex split site system comprising a second transmitter and a second receiver, the second transmitter and the second receiver communicatively coupled by a second data link;
wherein the first transmitter is configured to transmit a data payload to the second receiver via a high frequency (HF) link on a first frequency;
wherein the first receiver is configured to:
instruct the first transmitter to send a command to the second receiver to instruct the second transmitter to establish a maintenance link with the first receiver on a frequency different from the first frequency; and
command the first transmitter to begin transmitting the data payload to the second receiver;
wherein the second receiver is configured to:
collect and store metrics associated with the HF link;
perform operations to decrease a data rate for transmissions from the first transmitter to the second receiver based on the metrics;
compare the metrics against predetermined metric thresholds;
determine whether the metrics fail to support a current data rate based on the comparison of the metrics against the predetermined metric thresholds; and
output a maintenance message over the second data link to the second transmitter, the maintenance message instructing the second transmitter to send a link maintenance command over a second HF link to the first receiver to decrease a modulation for transmissions over the HF link to a lower data rate.

5. The system of claim 1, wherein the second receiver is further configured to:
compare the metrics against predetermined metric thresholds;
determine that channel degradation has occurred on the HF link; and
output an instruction, routed to the first receiver, to break the HF link and establish a new HF link.

6. The system of claim 1, wherein sampling intervals for the metrics are adjustable.

7. The system of claim 1, wherein the data payload is delivered by using an Automatic Repeat reQuest (ARQ) protocol.

8. The system of claim 1, wherein the first split site system is implemented on a vehicle.

9. The system of claim 1, wherein the second split site system is implemented on a vehicle.

10. The system of claim 1,
wherein the second transmitter is configured to transmit a second data payload to the first receiver via a second HF link on a second frequency;
wherein the second receiver is configured to:
instruct the second transmitter to send a command to the first receiver to instruct the first transmitter to establish a second maintenance link with the second receiver on a frequency different from the first frequency and the second frequency; and
command the second transmitter to begin transmitting the data payload to the first receiver.

11. A system, comprising:
a first full duplex split site system comprising a first transmitter and a first receiver, the first transmitter and the first receiver communicatively coupled by a first data link; and a second full duplex split site system comprising a second transmitter and a second receiver, the second transmitter and the second receiver communicatively coupled by a second data link;

wherein the first transmitter is configured to transmit a data payload to the second receiver via a high frequency (HF) link on a first frequency;

wherein the first receiver is configured to:
instruct the first transmitter to send a command to the second receiver to instruct the second transmitter to establish a maintenance link with the first receiver on a frequency different from the first frequency; and
command the first transmitter to begin transmitting the data payload to the second receiver;

wherein the second transmitter is configured to transmit a second data payload to the first receiver via a second HF link on a second frequency;

wherein the second receiver is configured to:
instruct the second transmitter to send a command to the first receiver to instruct the first transmitter to establish a second maintenance link with the second receiver on a frequency different from the first frequency and the second frequency; and
command the second transmitter to begin transmitting the data payload to the first receiver;

wherein the first receiver is further configured to collect and store second metrics associated with the second HF link, wherein the first receiver is further configured to perform operations to change a data rate for transmissions from the second transmitter to the first receiver based on the second metrics.

12. A first full duplex split site system communicatively coupled to a second full duplex split site system, the first full duplex split site system comprising:
a first transmitter; and
a first receiver, the first transmitter and the first receiver communicatively coupled by a data link, wherein the first receiver is configured to:
receive a data payload from a second transmitter of the second full duplex split site system via a high frequency (HF) link;
collect and store metrics associated with the HF link;
perform operations to change at least one of a data rate, a bandwidth, an interleaver length, or a radiofrequency (RF) frequency for transmissions from the second transmitter to the first receiver based on the metrics;
compare the metrics against predetermined metric thresholds;
determine whether the metrics support an increased data rate based on the comparison of the metrics against the predetermined metric thresholds; and
output a maintenance message over the data link to the first transmitter, the maintenance message instructing the first transmitter to send a link maintenance command to a second receiver of the second full duplex split site system to increase a modulation for transmissions over the HF link to a higher data rate.

13. The first full duplex split site system of claim 12, wherein the metrics include packet error data, signal-to-noise ratio (SNR) samples, multipath delay spread samples, impulse response samples, RF signal strength, and spectrum power data.

14. A first full duplex split site system communicatively coupled to a second full duplex split site system, the first full duplex split site system comprising:
a first transmitter; and
a first receiver, the first transmitter and the first receiver communicatively coupled by a data link, wherein the first receiver is configured to:
receive a data payload from a second transmitter of the second full duplex split site system via a high frequency (HF) link;
collect and store metrics associated with the HF link;
perform operations to change at least one of a data rate, a bandwidth, an interleaver length, or a radiofrequency (RF) frequency for transmissions from the second transmitter to the first receiver based on the metrics;
compare the metrics against predetermined metric thresholds;
determine whether the metrics fail to support a current data rate based on the comparison of the metrics against the predetermined metric thresholds; and
output a maintenance message over the data link to the first transmitter, the maintenance message instructing the first transmitter to send a link maintenance command over a second HF link to a second receiver of the second full duplex split site system to decrease a modulation for transmissions over the HF link to a lower data rate.

* * * * *